(12) United States Patent  
Fuller et al.

(10) Patent No.: US 7,910,260 B2  
(45) Date of Patent: Mar. 22, 2011

(54) METHOD FOR STABILIZING POLYELECTROLYTE MEMBRANE FILMS USED IN FUEL CELLS

(75) Inventors: Timothy J. Fuller, Pittsford, NY (US); Beba T. Dobulis, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1240 days.

(21) Appl. No.: 10/978,981

(22) Filed: Nov. 1, 2004

(65) Prior Publication Data

US 2006/0093875 A1 May 4, 2006

(51) Int. Cl.
  *H01M 8/00* (2006.01)
  *H01M 2/14* (2006.01)
(52) U.S. Cl. ......... 429/492; 429/413; 429/494; 427/115
(58) Field of Classification Search ......................... None
  See application file for complete search history.

(56) References Cited

U.S. PATENT DOCUMENTS

2003/0104236 A1* 6/2003 Nguyen et al. ................ 428/523

FOREIGN PATENT DOCUMENTS

SU 546498 A * 3/1977

OTHER PUBLICATIONS

Official English Translation of SU 546498 (RU 546498).*

* cited by examiner

*Primary Examiner* — R. Hodge  
(74) *Attorney, Agent, or Firm* — Reising Ethington P.C.

(57) ABSTRACT

A novel method of altering extruded membrane films for PEM (polymer electrolyte membrane) fuel cells in such a manner that the membrane films swell substantially uniformly in both the in-plane x and y directions when immersed in water or ionomer solution is disclosed. The invention includes cutting a membrane film from an extruded membrane sheet in a diagonal orientation with respect to the membrane process direction of the membrane sheet. The membrane film exhibits reduced internal stress as compared to conventionally-prepared membrane films and allows a more even distribution of pressure in a fuel cell stack, thereby reducing the incidence of swollen membrane-induced failure mechanisms in the fuel cell stack.

25 Claims, 2 Drawing Sheets

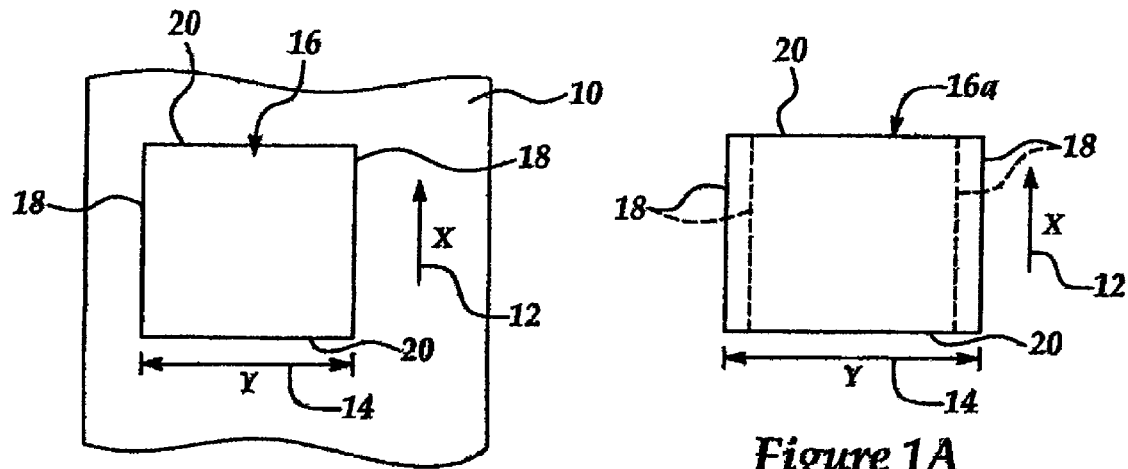
Figure 1
PRIOR ART
Figure 1A
PRIOR ART
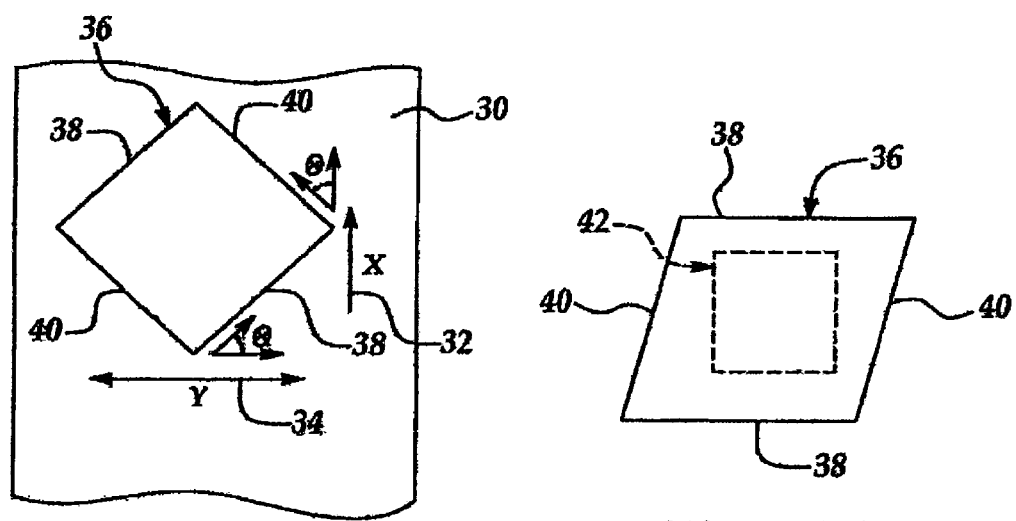
Figure 2
Figure 2A

METHOD FOR STABILIZING POLYELECTROLYTE MEMBRANE FILMS USED IN FUEL CELLS

FIELD OF THE INVENTION

The present invention relates to fuel cells which generate electricity to power vehicles or other machinery. More particularly, the present invention relates to a method for stabilizing a polyelectrolyte membrane (PEM) used in fuel cells by cutting the film from an extruded membrane sheet in a diagonal orientation with respect to the machine process direction and transverse direction of the membrane sheet.

BACKGROUND OF THE INVENTION

Fuel-cell technology is a relatively recent development in the automotive industry. It has been found that fuel cell power plants are capable of achieving efficiencies as high as 55%. Furthermore, fuel cell power plants emit only heat and water as by-products.

Fuel cells include three components: a cathode, an anode and an electrolyte, which is sandwiched between the cathode and the anode. Each electrode is coated on one side by a catalyst. In operation, the catalyst on the anode splits hydrogen into electrons and protons. The electrons are distributed as electric current from the anode, through a drive motor and then to the cathode, whereas the protons migrate from the anode, through the electrolyte to the cathode. The catalyst on the cathode combines the protons with electrons returning from the drive motor and oxygen from the air to form water. Individual fuel cells can be stacked together in series to generate increasingly larger quantities of electricity.

In a Polymer-Electrolyte-Membrane (PEM) fuel cell, a polymer electrode membrane serves as the electrolyte between a cathode and an anode. The polymer electrode membrane currently being used in fuel cell applications requires a certain level of humidity to facilitate conductivity of the membrane. Therefore, maintaining the proper level of humidity in the membrane, through humidity/water management, is very important for the proper functioning of the fuel cell. Irreversible damage to the fuel cell will occur if the membrane dries out.

In order to prevent leakage of the hydrogen fuel gas and oxygen gas supplied to the electrodes and prevent mixing of the gases, a gas-sealing material and gaskets are arranged on the periphery of the electrodes, with the polymer electrolyte membrane sandwiched there between. The sealing material and gaskets are assembled into a single part together with the electrodes and polymer electrolyte membrane to form a membrane and electrode assembly (MEA). Disposed outside of the MEA are conductive separator plates for mechanically securing the MEA and electrically connecting adjacent MEAs in series. A portion of the separator plate, which is disposed in contact with the MEA, is provided with a gas passage for supplying hydrogen fuel gas to the electrode surface and removing generated water vapor.

During fabrication of a fuel cell, the polymer electrolyte membrane of each MEA is produced in roll form under tension. The polymer electrolyte membrane has a high water uptake capability. Therefore, when wet, the membrane will expand in all three directions, although not proportionally. The membrane will shrink in all three dimensions upon subsequent drying.

Because the proton conductivity of PEM fuel cell membranes deteriorates rapidly as the membranes dry out, external humidification is required to maintain hydration of the membranes and sustain proper fuel cell functioning. Moreover, the presence of liquid water in automotive fuel cells is unavoidable because appreciable quantities of water are generated as a by-product of the electrochemical reactions during fuel cell operation. Furthermore, saturation of the fuel cell membranes with water can result from rapid changes in temperature, relative humidity, and operating and shutdown conditions. However, excessive membrane hydration results in flooding, excessive swelling of the membranes and the formation of differential pressure gradients across the fuel cell stack.

In order to maintain consistent fuel cell stack pressures, membranes are needed which swell uniformly and then only marginally in the presence of liquid water. Perfluorosulfonic acid (PFSA) membranes are typically used because of their advantaged oxidative, chemical and thermal stability and because of their superior proton conductivities at low relative humidity. PFSA membranes with a wide range of physical properties are available, and performance depends on the membrane's ion exchange capacity and the internal stresses and defects introduced during the membrane-film preparation process.

PFSA membranes with high acid numbers (or low equivalent weights) have enhanced proton conductivity at reduced relative humidity, but the mechanical properties of these membranes (especially with the high acid numbers) are compromised because of swelling due to high water uptake. The in-plane swelling of extruded membranes is further complicated because the membranes typically swell less in the machine process direction (the x-axis) as compared to the transverse direction (the y-axis) of the film. Non-uniform membrane swelling introduces the possibility of uneven, pressure-related stress failure mechanisms in fuel cell stacks.

Non-uniform membrane swelling is shown in FIG. 1, in which a membrane film 16 is conventionally cut from a membrane sheet 10 in such an orientation that the side edges 18 of the membrane film 16 are parallel to the machine process direction 12 and the transverse edges 20 of the membrane 16 are parallel to the transverse direction 14 of the membrane sheet 10. As shown in FIG. 1A, after immersion in water or ionomer solution, the swelled membrane film 16a expands to a greater extent along the transverse edges 20 than along the side edges 18. The side edges 18 of the pre-immersed membrane film 16a are indicated by the dashed lines in FIG. 1A.

One method used to make the membrane films swell more uniformly and reduce internal stress is to prepare membrane films by solution-casting rather than by extrusion-processing. Solvent cast films are expected to swell more uniformly and to have less internal stresses as compared with those of extruded films. Another approach is to reinforce the ionomer by incorporating it into a non-swelling support structure. This method is practiced by W. L. Gore, Inc., which markets composite membranes made with low equivalent weight, PFSA ionomer that is imbibed into a porous, expanded polytetrafluoroethylene support matrix. The structural strength of the membrane is reinforced and uniform swelling is maintained by the polytetrafluoroethylene support structure.

A novel method to improve the swelling uniformity and improve the mechanical strengths of extruded PFSA membranes has been found. This method includes cutting the membrane film from a sheet of the extruded membrane film in a diagonal orientation, such that membrane swelling or expansion becomes more uniform in the x and y directions. Drying of the swollen membrane film under tension, followed by re-cutting of the expanded membrane film, produces a functional polymer electrolyte membrane having a tendency to expand more uniformly in the x and y directions. Thus, internal stresses within the membrane are relieved throughout wet/dry cycles during functioning of the fuel cell.

SUMMARY OF THE INVENTION

The present invention is generally directed to a novel method of altering extruded membrane films for PEM (polymer electrolyte membrane) fuel cells in such a manner that the membrane films swell substantially uniformly in both the in-plane x and y directions when immersed in water or ionomer solution. The invention includes cutting a membrane film from an extruded membrane sheet in a diagonal orientation with respect to the membrane process direction (or "x" direction) and transverse direction (or "y" direction) of the membrane sheet. The membrane film is next immersed in water or ionic solution and expands substantially equally along the x and y directions, and then dried under tension. A functional polymer electrolyte membrane which is to be assembled into a membrane and electrode assembly (MEA) of a fuel cell stack is cut from the membrane film. The functional membrane exhibits reduced internal stress as compared to conventionally-prepared membranes and allows a more even distribution of pressure in a fuel cell stack, thereby reducing the incidence of swollen membrane-induced failure mechanisms in the fuel cell stack.

BRIEF DESCRIPTION OF THE DRAWINGS

The invention will now be described, by way of example, with reference to the accompanying drawings, in which:

FIG. 1 is a top view of an extruded membrane sheet segment, illustrating cutting of a membrane film from the membrane sheet in a parallel orientation with respect to the machine process direction and transverse direction of the membrane sheet according to a conventional method;

FIG. 1A is a top view of the membrane film of FIG. 1, illustrating expansion of the membrane film to a greater extent along the transverse direction than along the machine process direction upon immersion of the membrane film in water or ionomer solution;

FIG. 2 is a top view of an extruded membrane sheet segment, illustrating cutting of a membrane film from the membrane sheet in a diagonal orientation with respect to the machine process direction and transverse direction of the membrane sheet according to the method of the present invention;

FIG. 2A is a top view of the membrane film of FIG. 2, illustrating expansion of the membrane film substantially equally along the transverse direction and the machine process direction upon immersion of the membrane film in water or ionomer solution;

DETAILED DESCRIPTION OF THE INVENTION

The present invention contemplates a novel method of stabilizing a polyelectrolyte membrane (PEM) used in fuel cells which generate electricity to power vehicles or other machinery. The invention includes cutting a membrane film from an extruded membrane sheet in such a manner that the edges of the membrane film are disposed in a diagonal orientation with respect to the membrane process direction (or "x" direction) and the transverse direction (or "y" direction) of the membrane sheet. Upon subsequent immersion of the membrane film in water or ionomer solution, the membrane film expands substantially equally along the x and y directions. The membrane film is then dried under tension, thereby causing the expanded membrane film to retain its shape. A functional polymer electrolyte membrane (PEM) which is to be assembled into a membrane and electrode assembly (MEA) of a fuel cell stack is cut from the dried membrane film. The functional membrane exhibits reduced internal stress as compared to conventionally-prepared membranes. This allows a more even distribution of pressure in a fuel cell stack, reducing the incidence of swollen membrane-induced failure mechanisms in the fuel cell stack.

An extruded membrane sheet is mechanically stronger in the machine process direction than in the transverse direction. By cutting the membrane film from the membrane sheet in a diagonal orientation with respect to the machine process direction, the mechanical strengths of the membrane film along the two directions become approximately the same. Uniform swelling and improved, uniform mechanical strengths in both the machine process direction and the transverse direction are expected advantages to membranes cut in diagonal relationship to the machine process direction of an extruded membrane sheet. Moreover, less internal stress is anticipated in the expanded membrane film, as compared to expanded conventional membrane films.

Figure 3:
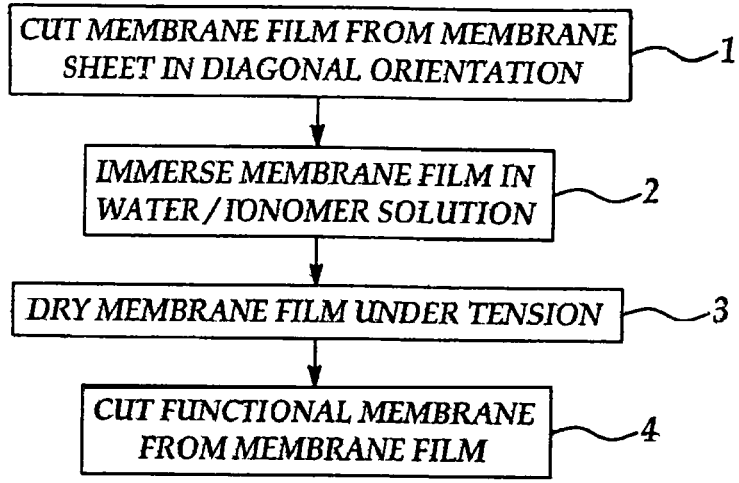
FIG. 3 is a flow diagram which summarizes sequential process steps carried out according to the method of the present invention.

Referring to FIGS. 2, 2A and 3, an extruded membrane sheet 30 is shown in FIG. 2. In typical application, the extruded membrane sheet 30 is perfluorosulfonic acid (PFSA), which is available in a wide range of physical properties. PFSA membranes are characterized by oxidative, chemical and thermal stability and high proton conductivity at low relative humidity. However, it is understood that alternative types of suitable material known by those skilled in the art may be used for the membrane sheet 30. A machine process direction (or x-direction) 32 indicates the direction in which the membrane sheet 30 is extended from a roll (not shown). A transverse direction (or y-direction) 34 extends perpendicular to the machine process direction 32.

As indicated in step 1 of FIG. 3 and as shown in FIG. 2, a generally square-shaped membrane film 36 is cut from the membrane sheet 30 using methods which are known to those skilled in the art. The membrane film 36 has side edges 38 which are disposed in a generally diagonal orientation with respect to both the machine process direction 32 and the transverse direction 34 of the membrane sheet 30. The membrane film 36 also includes transverse edges 40 which are disposed in a generally diagonal orientation with respect to the machine process direction 32 and the transverse direction 34. As further shown in FIG. 2, each side edge 38 and transverse edge 40 is preferably disposed at an angle θ of typically about 45 degrees with respect to the machine process direction 32 and the transverse direction 34.

As indicated in step 2 of FIG. 3, the membrane film 36 cut from the membrane sheet 30 is next immersed in water or an ionomer solution (not shown). The ionomer solution may be Asahi-Kasei 700SS ionomer solution, for example. As the water or ionomer solution enters the membrane film 36, the membrane film 36 expands or swells. Accordingly, due to the diagonal orientation at which the membrane film 36 was previously cut from the membrane sheet 30, the side edges 38 and transverse edges 40 of the membrane film 36 expand to substantially the same degree. The expanded membrane film 36, submerged in the water or ionomer solution, assumes a generally diamond-shaped configuration, as shown in FIG. 2A. It is understood that the membrane film 36 may be cut from the membrane sheet 30 with the side edges 38 and transverse edges 40 disposed at various diagonal angles (other than 90 degrees) with respect to the machine process direction 32 and transverse direction 34, as long as cutting the membrane film 36 from the membrane sheet 30 at such angles causes the expanded membrane film 36 to generally approximate a square or diamond shape after immersion in the water or ionomer solution.

As indicated in step 3 of FIG. 3, the expanded membrane film 36 is next dried under tension according to techniques known to those skilled in the art. The drying step stabilizes the expanded membrane film 36 in the generally diamond-shaped configuration of FIG. 2A. Finally, as indicated in step 4 and as shown in FIG. 2A, a functional polymer electrolyte membrane 42 is cut from the membrane film 36.

The functional membrane 42 cut from the membrane film 36 is used to assemble a membrane electrode assembly (MEA). In the MEA, the functional polymer electrolyte membrane 42 is interposed between an anode layer (not shown) and a cathode layer (not shown) in the MEA. The MEA may be assembled using conventional techniques which are known to those skilled in the art. In a fuel cell, multiple MEAs are assembled in fuel cell stacks, with one MEA per cell. The fuel cell generates electricity for powering a vehicle or machinery.

During operation of the fuel cell, the functional polymer electrolyte membrane 36 of each MEA in the fuel cell stack is repeatedly subjected to wet/dry cycles, each of which may reach relative humidity levels of up to 150%. During the wet portion of each cycle, the functional polymer electrolyte membrane 42 which forms a part of each MEA expands substantially uniformly in the x-direction 32 and y-direction 34. Accordingly, it will be appreciated by those skilled in the art that such uniform expansion facilitates a more even distribution of pressure in the fuel cell stack. This reduces the incidence of swollen membrane-induced failure mechanisms in the fuel cell stack during operation of the fuel cell.

Tables I and II below summarize changes in dimensions, water uptake and area for membrane films cut from PFSA membrane sheets in various orientations relative to the machine process direction used to make the membrane sheets.

TABLE I

| Membrane | Imbibing Material | Original Dimensions x, y (cm) | Expanded Dimensions x, y (cm) | % Increase x, y | Area Increase |
|---|---|---|---|---|---|
| AK 1101 | AK 700 SS | 10.5 × 10.5 | 10.85, 12.95 | 3.3, 23.3 | 1.27× |
| AK 1101 | AK 700 SS | 10.5 × 10.5 | 11.5, 11.9 | 9.5, 13.3 | 1.23× |
| AK 1101 | AK 700 SS | 10.5 × 10.5 | 10.8 × 11.95 | 2.9, 13.8 | 1.18× |

TABLE II

| Membrane | Wt. Uptake (%) | Thickness Change | Initial Membrane Wt. (g) | x-Axis Cut Relative to Process Direction | Expanded Membrane Shape |
|---|---|---|---|---|---|
| AK 1101 | 16.4 | 31 to 24 | 0.6 | Parallel-90° | Rectangle |
| AK 1101 | 8.3 | 31 to 23 | 0.6 | Perpendicular-45° | Diamond |
| AK 1101 | 16.1 | 31 to 26 | 0.5 | Angle-15° and 75° | Rectangle |

The invention will be further understood by consideration of the following examples.

Example I

Pieces of 10.5 cm×10.5 cm square membrane film were cut out from a roll of extended Asahi-Kasei 1101 PFSA membrane sheet in various orientations relative to the machine process direction of the membrane sheet. After immersion in Asahi-Kasei 700SS ionomer solution, the pieces of swollen membrane were dried under tension. The dry, expanded membrane films were observed to have swelled non-uniformly along the machine process and transverse directions and had the dimensions summarized in Tables I and II (above).

Example II

Pieces of 10.5 cm×10.5 cm square membrane films were cut out from a roll of extended Asahi-Kasei 1101 PFSA membrane sheet in a diagonal orientation relative to the machine process direction of the membrane sheet. After immersion in Asahi-Kasei 700SS ionomer solution, the pieces of swollen membrane were dried under tension. The dry, expanded membrane films were observed to have swelled uniformly along the machine process direction and the transverse direction and had the dimensions summarized in Tables I and II.

Example III

A square 10.5 cm×10.5 cm membrane film was cut from an Asahi-Kasei extruded 1101 membrane sheet, with the side edges of the membrane film oriented in parallel relationship to the machine process direction of the membrane sheet. The membrane film was immersed in Asahi-Kasei 700SS ionomer solution. The initially square-shaped membrane film became an expanded or swollen rectangle that was dried under tension to obtain a rectangle with new dimensions of 11 cm×12.95 cm. The expansion of the membrane film was greater in the transverse direction than in the machine process direction of the membrane sheet.

Example IV

A square 10.5 cm×10.5 cm membrane film was cut from an Asahi-Kasei extruded 1101 membrane sheet, with the base edge of the membrane film oriented at a 15 degree angle to the transverse direction and the left side edge oriented at a 75 degree angle with respect to the transverse direction of the membrane sheet. The membrane film was immersed in Asahi-Kasei 700SS ionomer solution. The square-shaped membrane film became and expanded or swollen rectangle that was dried under tension to obtain a rectangle with new dimensions of 12 cm×11 cm. The expansion of the membrane film was greater in the machine process direction than in the transverse direction of the membrane sheet.

Example V

A square 10.5 cm×10.5 cm membrane film was cut from an Asahi-Kasei extruded 1101 membrane sheet, with the edges of the membrane film oriented at a 45 degree angle to the machine process direction of the membrane sheet. The membrane film was immersed in Asahi-Kasei 700SS ionomer solution. The square-shaped membrane film became an expanded or swollen rectangle that was dried under tension to obtain a rectangle with new dimensions of 12 cm×12 cm. The expansion of the membrane film was substantially the same in both directions of the membrane sheet.

Example VI

Pieces of 10.5 cm×10.5 cm square membrane film were cut out from a roll of extended Asahi-Kasei 1101 PFSA membrane sheet in various orientations relative to the machine process direction of the membrane sheet. After immersion in Asahi-Kasei 900SS ionomer solution, the pieces of swollen membrane were dried under tension. The dry, expanded membrane films were observed to have swelled non-uniformly along the machine process and transverse directions. This membrane was cut into a 4-inch by 4-inch square and then tested in a fuel cell with catalyst coated diffusion media as the electrode.

Table III and Table IV are summaries of 50-cm$^2$, fuel cell data, which were obtained at high and low gas pressures, with this SK-1101 membrane that was modified by immersion into a 900 equivalent weight ionomer solution consisting of 1.11 milliequivalents of sulfonic acid groups per gram of resin solids ionomer solution, as a 5-weight percent solids, dispersed in mixed alcohols with water. The current density labeled "i" (in A/cm$^2$) was applied at an anode and cathode pressure of 7 and 25 psi gauge with a stoichiometry of 2 moles of hydrogen to 2 moles of air, and the resulting related cell voltage, E (in volts) was measured. The electrical resistance of the cell as a function of current density is reported as the term HFR, which is the high frequency resistance after an alternating current perturbation at 1 kilo-Hertz. The cell resistance is the sum of the proton-conduction resistance in the membrane and the various electronic resistances including bulk and contact resistances. Thus, the HFR relates to the resistances of the electrode with catalyst, diffusion media and the membrane. Adding the HFR* current density to the cell voltage, E, allows a determination of the maximum theoretical cell voltage output of the cell and is reported as $E_{iRfree}$. An advantage of the film treatment described is a better match of the treated membrane to the PFSA in the catalyst layer. This is especially beneficial when catalyst coated diffusion media is treated with a lower equivalent weight ionomer than the one used in the membrane. The membrane treatment described herein allows for better adhesion of the membrane to the catalyst layer as well. This impacts the HFR by lowering the experimentally measured value. The term "sd" in the table refers to standard deviation.

TABLE III

High Pressure Performance (270 kPa$_{abs}$)

| i (A/cm$^2$) | $E_{cell}$ (V) | sd_Ecell | HFR (ohm * cm$^2$) | sd_HFR | $E_{iR\text{-}free}$ (V) | sd_$E_{iR\text{-}free}$ |
|---|---|---|---|---|---|---|
| 0.0002 | 0.9955 | 0.0028 | 0.0048 | 0.0027 | 0.9955 | 0.0028 |
| 0.0216 | 0.8774 | 0.0040 | 0.1398 | 0.0816 | 0.8804 | 0.0024 |
| 0.0416 | 0.8541 | 0.0012 | 0.1004 | 0.0079 | 0.8583 | 0.0012 |
| 0.0820 | 0.8274 | 0.0004 | 0.0892 | 0.0061 | 0.8347 | 0.0008 |
| 0.1216 | 0.8079 | 0.0009 | 0.0828 | 0.0052 | 0.8179 | 0.0014 |
| 0.2014 | 0.7816 | 0.0005 | 0.0716 | 0.0056 | 0.7960 | 0.0009 |
| 0.4012 | 0.7386 | 0.0008 | 0.0710 | 0.0011 | 0.7671 | 0.0011 |
| 0.8010 | 0.6789 | 0.0023 | 0.0670 | 0.0033 | 0.7326 | 0.0024 |
| 1.0008 | 0.6476 | 0.0029 | 0.0683 | 0.0026 | 0.7160 | 0.0010 |
| 1.2006 | 0.6230 | 0.0014 | 0.0635 | 0.0064 | 0.6993 | 0.0077 |
| 1.5006 | 0.5816 | 0.0008 | 0.0672 | 0.0004 | 0.6824 | 0.0009 |

TABLE IV

Low Pressure Performance (150 kPa$_{abs}$)

| i (A/cm$^2$) | $E_{cell}$ (V) | sd_Ecell | HFR (ohm * cm$^2$) | sd_HFR | $E_{iR\text{-}free}$ (V) | sd_$E_{iR\text{-}free}$ |
|---|---|---|---|---|---|---|
| 0.0002 | 0.9786 | 0.0019 | 0.0051 | 0.0020 | 0.9787 | 0.0019 |
| 0.0216 | 0.9033 | 0.0028 | 0.1280 | 0.0498 | 0.9061 | 0.0026 |
| 0.0416 | 0.8810 | 0.0007 | 0.1007 | 0.0124 | 0.8852 | 0.0012 |
| 0.0820 | 0.8545 | 0.0020 | 0.1044 | 0.0123 | 0.8631 | 0.0012 |
| 0.1216 | 0.8394 | 0.0008 | 0.0620 | 0.0017 | 0.8469 | 0.0007 |
| 0.2014 | 0.8103 | 0.0012 | 0.0716 | 0.0030 | 0.8247 | 0.0014 |
| 0.4012 | 0.7679 | 0.0055 | 0.0695 | 0.0089 | 0.7958 | 0.0026 |
| 0.8010 | 0.7074 | 0.0047 | 0.0592 | 0.0034 | 0.7548 | 0.0022 |
| 1.0008 | 0.6812 | 0.0065 | 0.0518 | 0.0030 | 0.7330 | 0.0047 |
| 1.2006 | 0.6409 | 0.0044 | 0.0496 | 0.0013 | 0.7004 | 0.0050 |
| 1.5006 | 0.5728 | 0.0078 | 0.0485 | 0.0003 | 0.6456 | 0.0082 |

Figure 4:
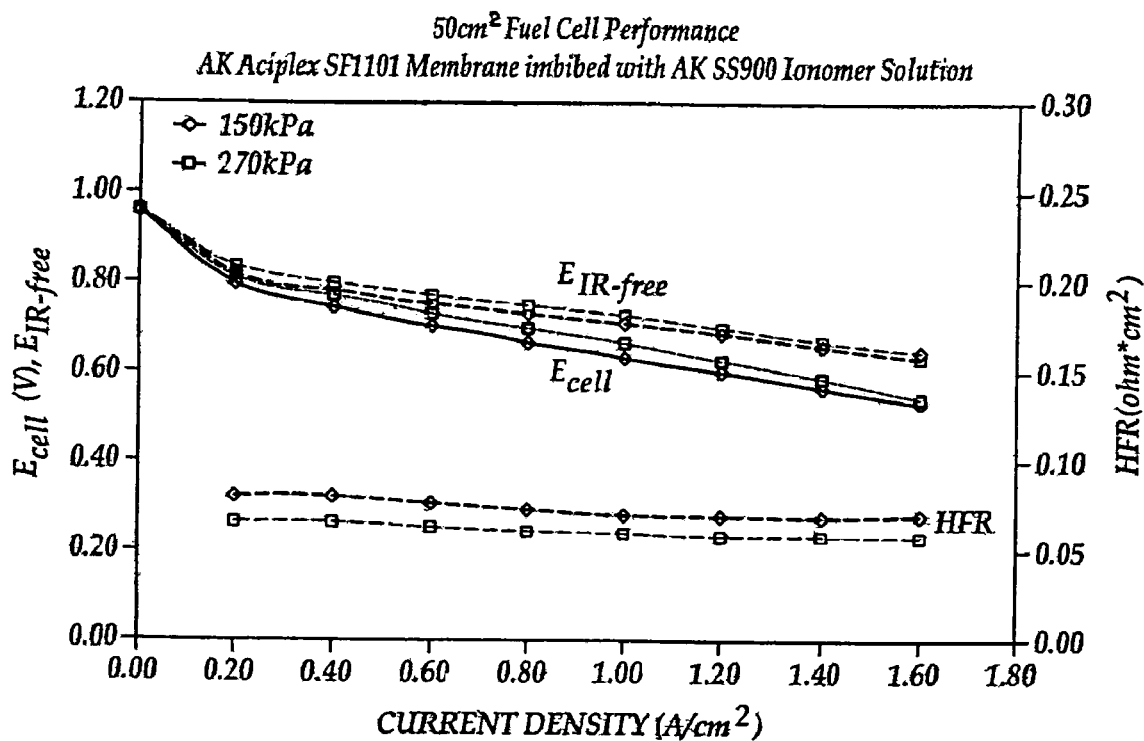
FIG. 4 is a graph which presents a plot of cell voltage versus cell current density for an Aciplex 1101 membrane (from Asahi-Kasei) imbibed with Asahi Kasei SS 900 equivalent weight ionomer.

FIG. 4 presents, in graphical form, the electrical performance data for a fuel cell, which incorporates the treated PFSA membrane films of the present invention. The cell performance was very good. The cell voltage was in excess of 0.65 volts with a current density of 1.2 A/cm$^2$. The HFR corrected values show cell voltage in excess of 0.7 volts at a current density of 1.2 A/cm$^2$.

While the preferred embodiments of the invention have been described above, it will be recognized and understood that various modifications can be made in the invention and the appended claims are intended to cover all such modifications which may fall within the spirit and scope of the invention.

What is claimed is:

1. A method of stabilizing a polyelectrolyte membrane film, comprising:
   providing an extruded polyelectrolyte membrane sheet having an extrusion machine process direction axis and a transverse axis, the extruded polyelectrolyte membrane sheet being stronger in the process direction axis than in the transverse axis; and
   cutting a membrane film from said membrane sheet in generally diagonal relationship with respect to said machine process direction axis.

2. The method of claim 1 wherein said membrane sheet comprises perfluorosulfonic acid.

3. The method of claim 1 wherein said cutting a membrane film from said membrane sheet comprises cutting a membrane film from said membrane sheet with each of two side edges and two transverse edges of said membrane film disposed at substantially a 45 degree angle with respect to said machine process direction axis.

4. The method of claim 1 wherein said membrane sheet comprises perfluorosulfonic acid and said cutting a membrane film from said membrane sheet comprises cutting a membrane film from said membrane sheet with each of two side edges and two transverse edges of said membrane film disposed at substantially a 45 degree angle with respect to said machine process direction axis matching the vectors of expansion with the cut of the membrane.

5. The method of claim 1 further comprising providing a liquid and immersing said membrane film in said liquid, whereby said membrane film undergoes substantially uniform planar expansion.

6. The method of claim 5 wherein said membrane film has a substantially square-shaped configuration.

7. The method of claim 5 wherein said liquid comprises water.

8. The method of claim 5 wherein said liquid comprises ionomer solution.

9. A method of stabilizing a polyelectrolyte membrane film, comprising:
- extending an extruded polyelectrolyte membrane sheet from a roll along an extension machine process direction axis, the membrane sheet being stronger in the process direction axis than in a traverse direction axis;
- cutting a membrane film from said membrane sheet in generally diagonal relationship with respect to said machine process direction axis;
- providing a liquid; and
- immersing said membrane film in said liquid, whereby said membrane film undergoes substantially uniform planar expansion.

10. The method of claim 9 wherein said membrane sheet comprises perfluorosulfonic acid.

11. The method of claim 9 wherein said cutting a membrane film from said membrane sheet comprises cutting a membrane film from said membrane sheet with each of two side edges and two transverse edges of said membrane film disposed at substantially a 45 degree angle with respect to said machine process direction axis.

12. The method of claim 9 wherein said membrane sheet comprises perfluorosulfonic acid and said cutting a membrane film from said membrane sheet comprises cutting a membrane film from said membrane sheet with each of two side edges and two transverse edges of said membrane film disposed at substantially a 45 degree angle with respect to said machine process direction axis.

13. The method of claim 9 wherein said liquid comprises water.

14. The method of claim 9 wherein said liquid comprises ionomer solution.

15. The method of claim 9 further comprising cutting a functional polymer electrolyte membrane from said membrane film after said immersing said membrane film in said liquid.

16. The method of claim 15 wherein said cutting a membrane film from said membrane sheet comprises cutting a membrane film from said membrane sheet with each of two side edges and two transverse edges of said membrane film disposed at substantially a 45 degree angle with respect to said machine process direction axis.

17. A method as set forth in claim 1 wherein the providing a membrane sheet comprises extruding a membrane material.

18. A method as set forth in claim 8 further comprising drying the membrane sheet under tension.

19. A method as set forth in claim 9 further comprising extruding a membrane material to provide the membrane sheet.

20. A method as set forth in claim 14 further comprising drying the membrane sheet under tension.

21. A method of stabilizing a polyelectrolyte membrane film, comprising:
- providing an extruded polyelectrolyte membrane sheet having an extrusion machine processing direction axis and a transverse axis, the extruded polyelectrolyte membrane sheet being stronger in the process direction axis than in the transverse axis; and cutting a membrane film from said membrane sheet with each of two side edges and two transverse edges oriented in a generally diagonal relationship with respect to said machine process direction axis;
- providing a liquid;
- immersing said membrane film in said liquid so that the membrane film undergoes substantially uniform planar expansion.

22. A method as set forth in claim 21 wherein each of the two side edges and the two transverse edges of said membrane film are disposed at substantially a 45° angle with respect to said membrane process direction axis.

23. A method as set forth in claim 22 wherein the membrane film has a substantially square-shaped configuration.

24. A method as set forth in claim 21 wherein the liquid comprises water.

25. A method as set forth in claim 21 wherein the liquid comprises an ionomer solution.

* * * * *